US012378788B2

(12) United States Patent
Grant, Jr. et al.

(10) Patent No.: US 12,378,788 B2
(45) Date of Patent: Aug. 5, 2025

(54) DEMOLITION MACHINE

(71) Applicant: LAG Equipment, Pittsburgh, PA (US)

(72) Inventors: Louis A. Grant, Jr., Murrysville, PA (US); Michael Jobe, Greensburg, PA (US); John Davidson, Pittsburgh, PA (US)

(73) Assignee: LAG Equipment, Trafford, PA (US)

( * ) Notice: Subject to any disclaimer, the term of this patent is extended or adjusted under 35 U.S.C. 154(b) by 391 days.

(21) Appl. No.: 17/847,696

(22) Filed: Jun. 23, 2022

(65) Prior Publication Data

US 2022/0412110 A1 Dec. 29, 2022

Related U.S. Application Data

(60) Provisional application No. 63/215,185, filed on Jun. 25, 2021.

(51) Int. Cl.
*E04G 23/08* (2006.01)

(52) U.S. Cl.
CPC ........ *E04G 23/08* (2013.01); *E04G 2023/087* (2013.01)

(58) Field of Classification Search
CPC ........................... E04G 23/08; E04G 2023/087
USPC ....................................................... 52/749.1
See application file for complete search history.

(56) References Cited

U.S. PATENT DOCUMENTS

| 3,346,300 | A | * | 10/1967 | Grant | ........................ C21B 7/06 |
| | | | | | 173/52 |
| 3,389,755 | A | | 6/1968 | Grant | |
| 3,532,234 | A | | 10/1970 | Grant | |
| 3,814,407 | A | | 6/1974 | Meyers | |
| 3,831,770 | A | * | 8/1974 | Gottlieb | .................... B66C 1/10 |
| | | | | | 52/745.03 |
| 3,913,756 | A | | 10/1975 | Barron et al. | |
| 3,995,344 | A | | 12/1976 | Meyers | |
| 4,087,084 | A | | 5/1978 | Meyers | |
| 4,177,975 | A | | 12/1979 | Meyers et al. | |
| 4,233,119 | A | | 11/1980 | Meyers et al. | |
| 5,020,183 | A | | 6/1991 | Grant, Jr. | |
| 5,020,962 | A | * | 6/1991 | Ramun | .................... E04G 23/08 |
| | | | | | 212/262 |
| 5,179,757 | A | | 1/1993 | Grant, Jr. | |
| 5,294,318 | A | | 3/1994 | Grant, Jr. et al. | |
| 6,663,825 | B2 | | 12/2003 | Grant, Jr. et al. | |
| 6,988,775 | B2 | * | 1/2006 | Okamoto | ................ E04G 23/08 |
| | | | | | 299/18 |
| 2010/0296904 | A1 | * | 11/2010 | Muraoka | ............... E04G 23/082 |
| | | | | | 294/206 |

(Continued)

*Primary Examiner* — James J Buckle, Jr.

(74) *Attorney, Agent, or Firm* — The Webb Law Firm

(57) ABSTRACT

A demolition machine includes a deck having a front edge, a rear edge, a left side, and a right side, with the deck defining a central axis along a direction extending from the rear edge to the front edge and equally spaced from the left side and the right side of the deck, a drive assembly secured to the deck, with the drive assembly rotatable relative to the deck, an engine received by the deck and positioned at one of the left side and right side of the deck, an energy reservoir and hydraulic reservoir each received by the deck and positioned on an opposite side of the deck from the engine, and a boom assembly secured to a boom support structure of the deck. The boom assembly is moveable relative to the deck, with the boom support structure positioned on the central axis.

13 Claims, 11 Drawing Sheets

(56) References Cited

U.S. PATENT DOCUMENTS

2023/0081760 A1\*　3/2023　Kumata .................... E02F 3/32
　　　　　　　　　　　　　　　　　　　　　　　414/722

\* cited by examiner

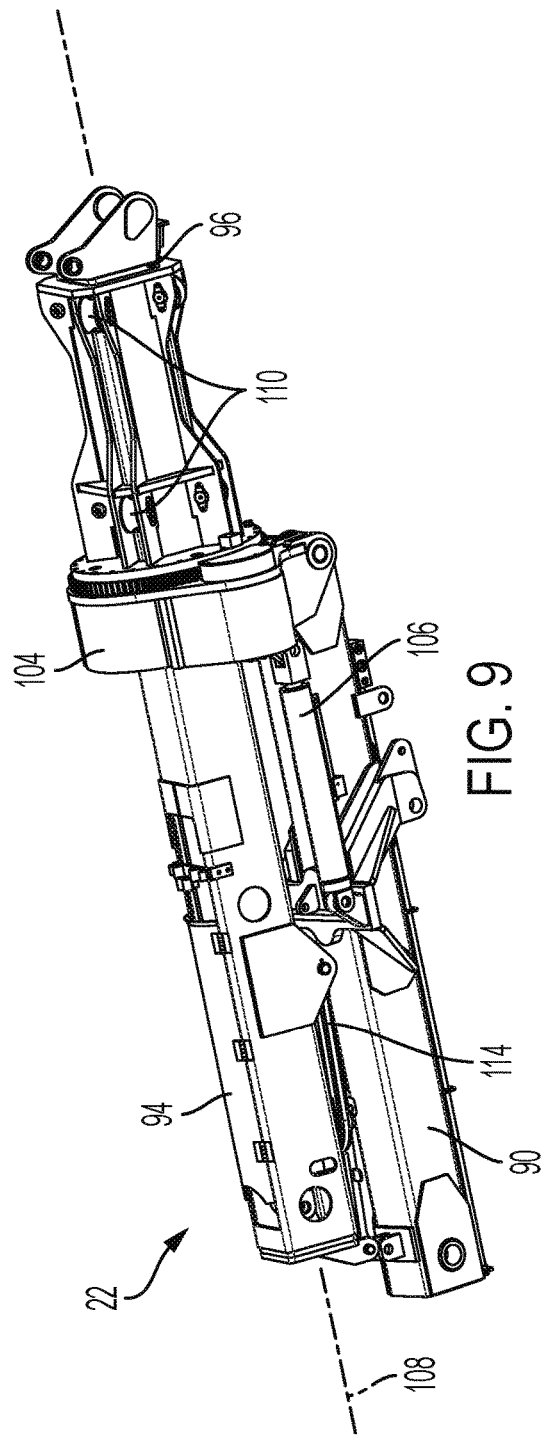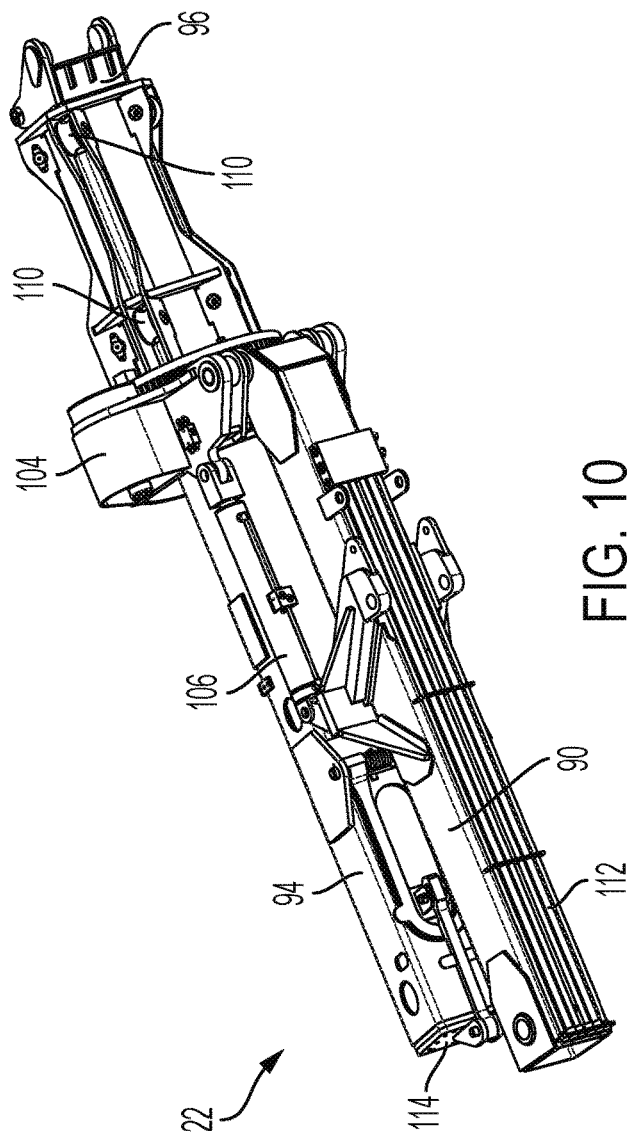

DEMOLITION MACHINE

CROSS-REFERENCE TO RELATED APPLICATION

This application claims priority to U.S. Provisional Application No. 63/215,185, filed Jun. 25, 2021, which is hereby incorporated by reference in its entirety.

BACKGROUND OF THE INVENTION

Field of the Disclosure

The present disclosure relates generally to a demolition machine.

Description of the Related Art

Demolition machines are utilized to remove refractory or other structure in and around furnaces for the various industries, including refractory linings used in the manufacture of metals. These demolition machines may be remote-controlled and are configured to be lifted and placed into hard-to-access locations via a lift or crane. The demolition machines may be powered by an internal combustion engine or an electric motor, with tracks to move the machine, a boom arm and related structures that can be articulated, and a tool, such as a hydraulic hammer, positioned on the boom arm. The demolition machines are often exposed to harsh conditions, including high temperatures.

SUMMARY OF THE INVENTION

In one aspect or embodiment, a demolition machine includes a deck having a front edge, a rear edge, a left side, and a right side, with the deck defining a central axis along a direction extending from the rear edge to the front edge and the central axis equally spaced from the left side and the right side of the deck, a drive assembly secured to the deck, with the drive assembly rotatable relative to the deck, an engine received by the deck and positioned at one of the left side and right side of the deck, an energy reservoir and hydraulic reservoir each received by the deck and positioned on an opposite side of the deck from the engine, and a boom assembly secured to a boom support structure of the deck. The boom assembly is moveable relative to the deck, with the boom support structure positioned on the central axis.

The engine may be received within a first enclosure, with the energy reservoir and hydraulic reservoir received within a second enclosure. The energy reservoir may be a fuel tank, with the engine including a diesel internal combustion engine. The demolition machine may include first and second counterweights received by the deck and positioned at the rear edge of the deck. The first counterweight may be spaced from the second counterweight to define a boom gap, where the boom gap is configured to receive a portion of the boom assembly during use of the boom assembly.

The deck and/or the boom assembly may include a hoist attachment, where the hoist attachment is positioned along a center of gravity of the demolition machine such that the deck of the demolition machine remains balanced when lifting the demolition machine via the hoist attachment. The demolition machine may include a hydraulic system in fluid communication with the hydraulic reservoir, with the hydraulic system including a kidney loop hydraulic cooling system. The kidney loop hydraulic cooling system may be positioned adjacent to the hydraulic reservoir.

The drive assembly may include a track undercarriage. The track undercarriage may include a plurality of tie-down rings. The track undercarriage may include first and second tracks having a track width, where the track width is 16 inches or less. The drive assembly may be rotatable relative to the deck via a bearing and pivot assembly, with the bearing and pivot assembly including a sealed bearing having a bearing gear and a worm gear engaged with the bearing gear. The engagement between the bearing gear and the worm gear may include at least six points of contact, with the worm gear driven by a hydraulic motor.

In a further aspect or embodiment, a boom assembly for a demolition machine includes a main support comprising a support cylinder configured to raise and lower the main support, an outer boom arm attached to the main support, an inner boom arm received within the outer boom arm, with the inner boom arm axially moveable relative to the outer boom arm via an inner boom cylinder, and a hydraulically actuated tool implement. Hydraulic lines for the hydraulically actuated tool implement are received within the inner boom arm.

The outer boom arm may be attached to the main support via a cradle, with the cradle pivotable relative to the main support via a cradle cylinder. The outer boom arm may be rotatable about a longitudinal axis of the outer boom arm and relative to the main support via the cradle. The outer boom arm may include a plurality of rollers engaged with an outer surface of the inner boom arm. The hydraulically actuated tool implement may include a hydraulic hammer. The support cylinder, the inner boom cylinder, and the cradle cylinder may each include hydraulic cylinders having integrated counterbalance valves.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein:

FIG. 9 is a perspective view of the boom assembly of FIG. 6, showing a retracted position of an inner boom arm;

FIG. 10 is a bottom perspective view of the boom assembly of FIG. 6, showing a retracted position of an inner boom arm;

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION

Figure 2:
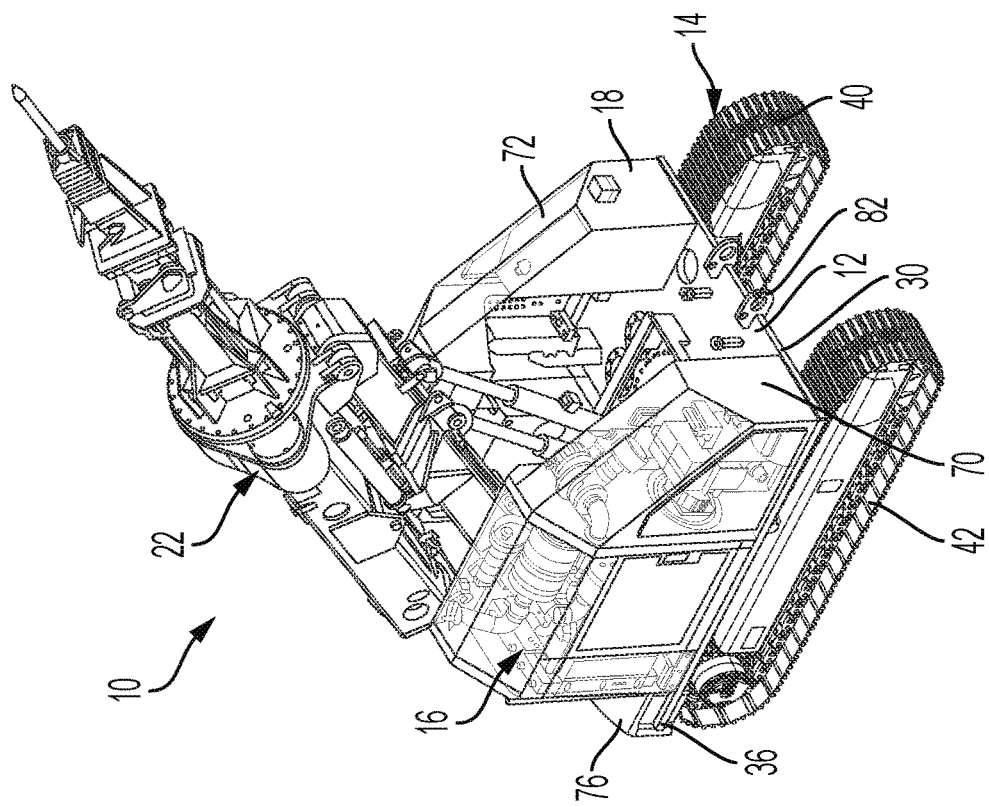
FIG. 2 is a right side perspective view of the demolition machine of FIG. 1.
Figure 1:
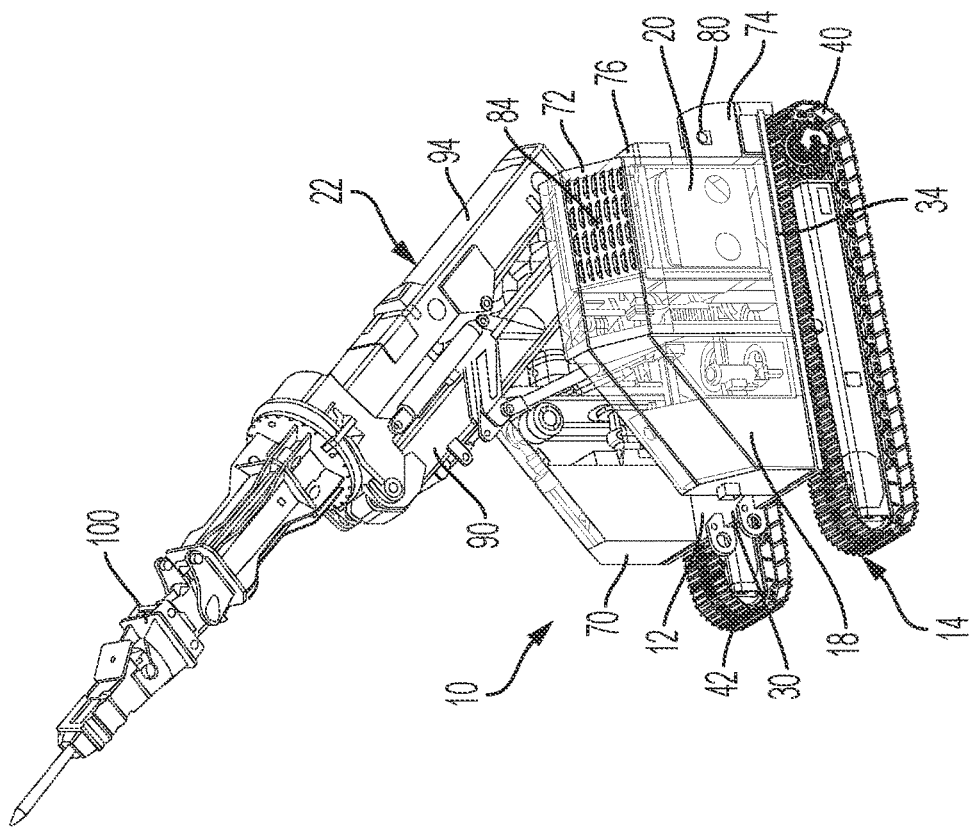
FIG. 1 is a left side perspective view of a demolition machine according to one aspect or embodiment of the present application.
Figure 3:
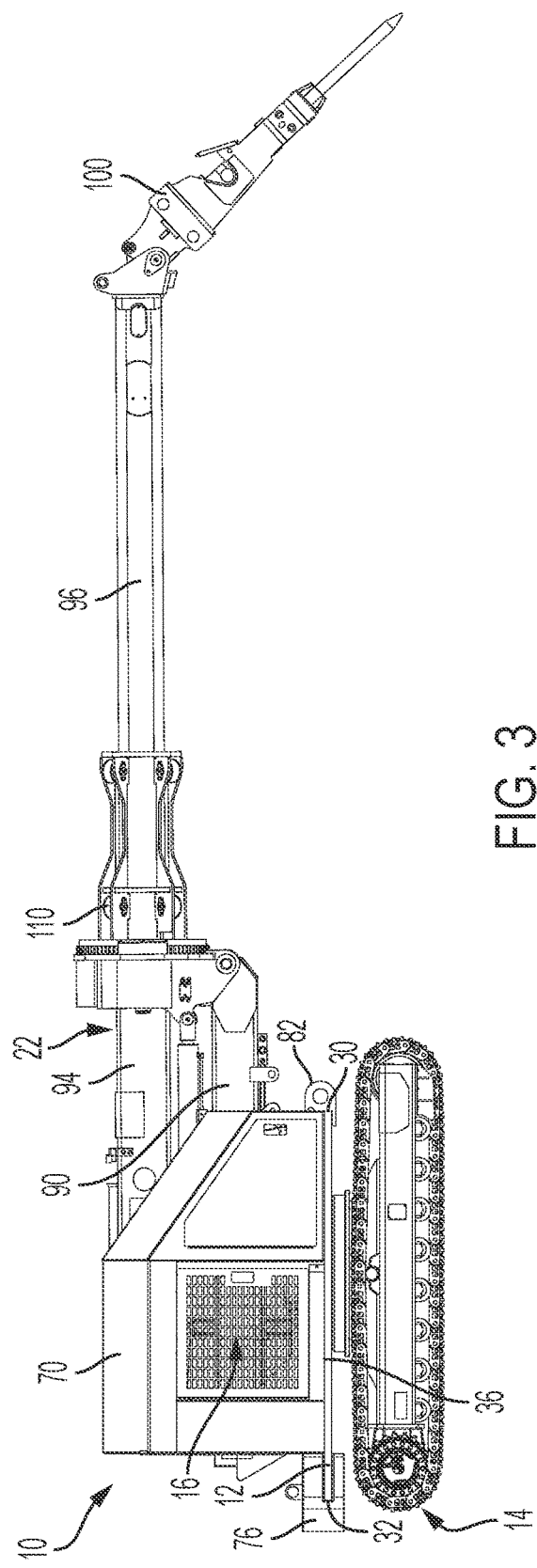
FIG. 3 is a right side view of the demolition machine of FIG. 1.
Figure 4:
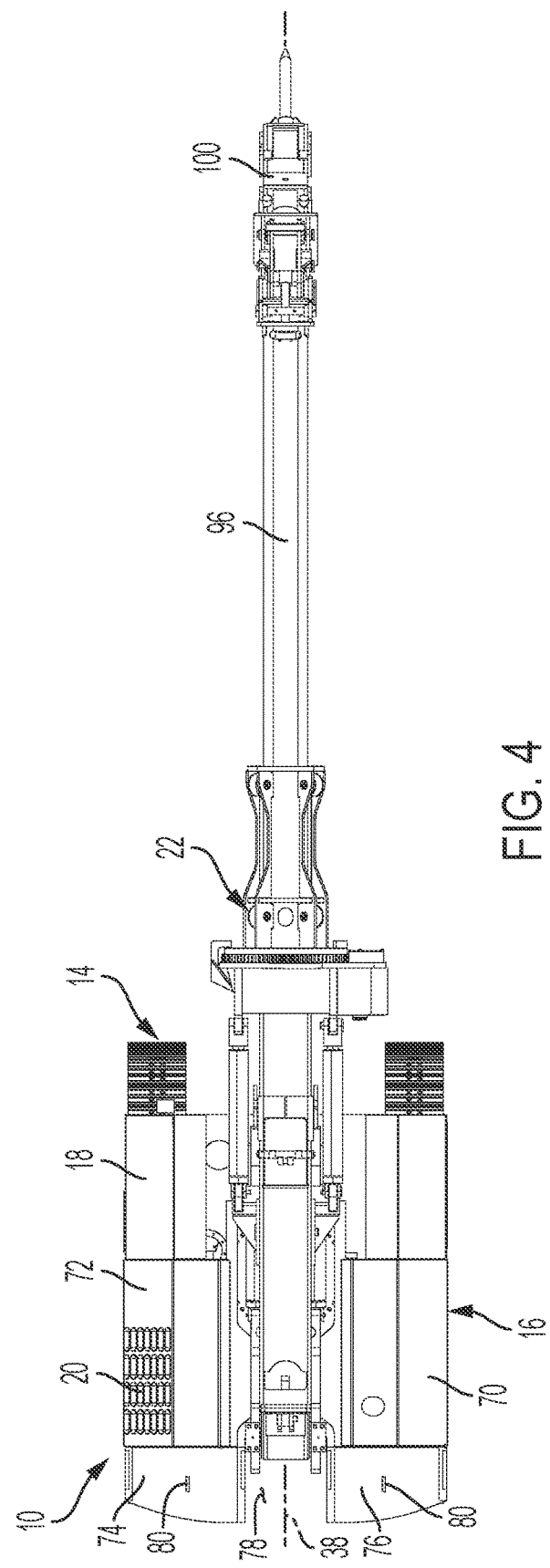
FIG. 4 is a top view of the demolition machine of FIG. 1.
Figure 6:
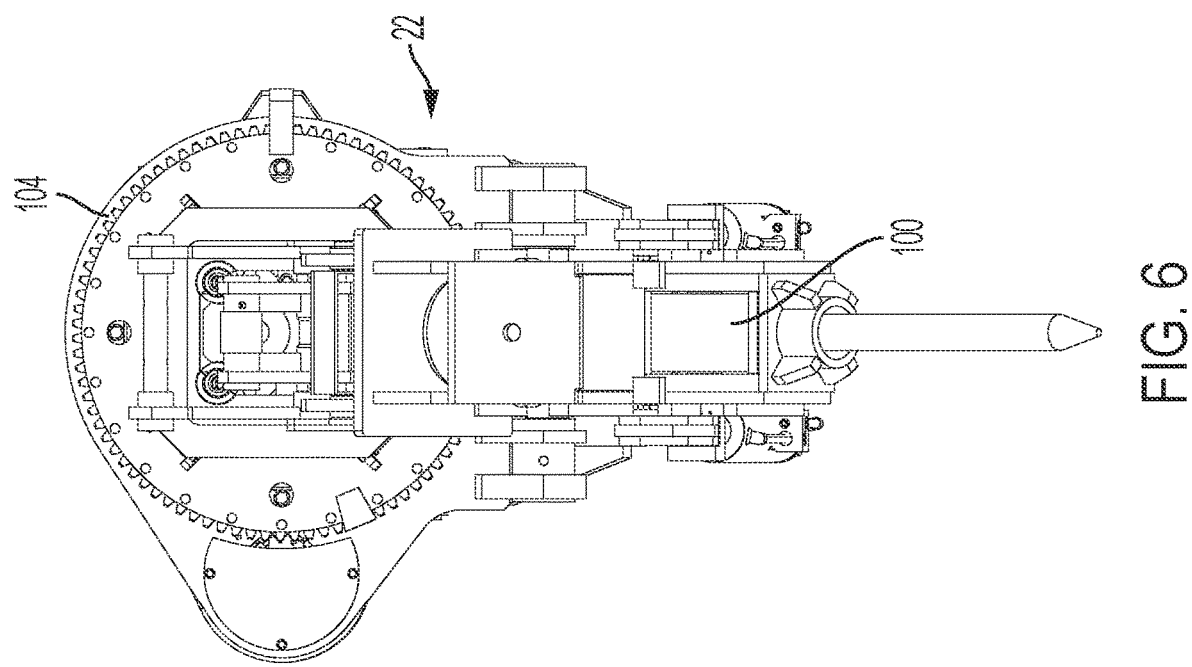
FIG. 6 is a front view of a boom assembly of the demolition machine of FIG. 1.
Figure 5:
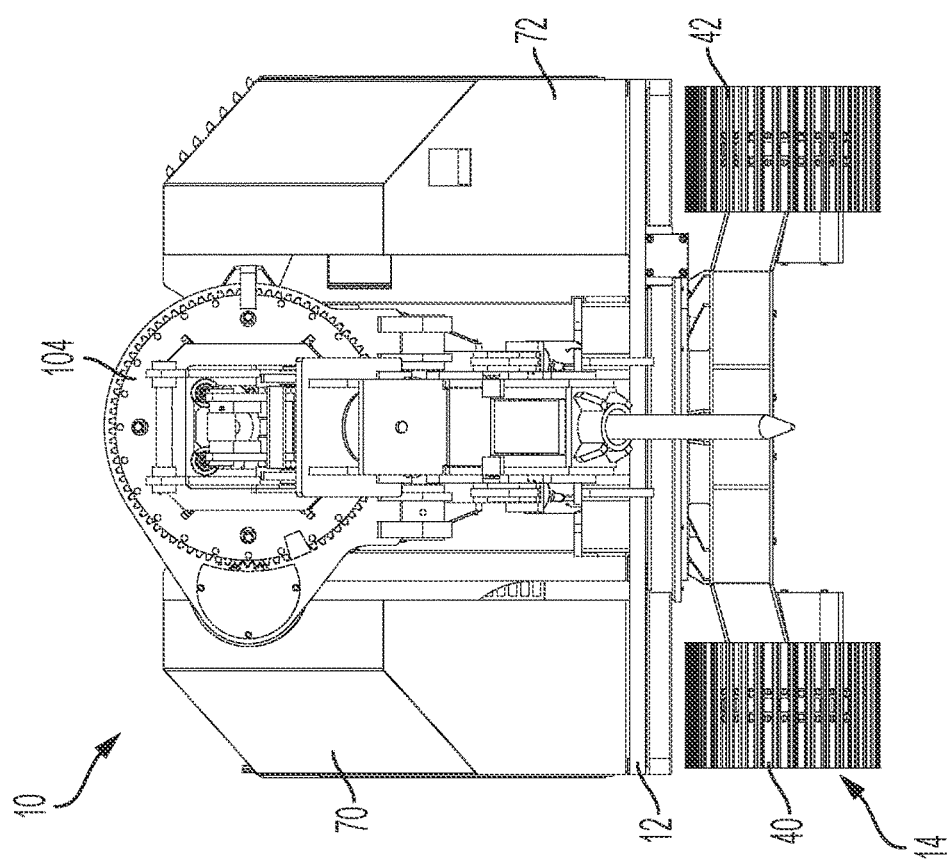
FIG. 5 is a front view of the demolition machine of FIG. 1.
Figure 7:
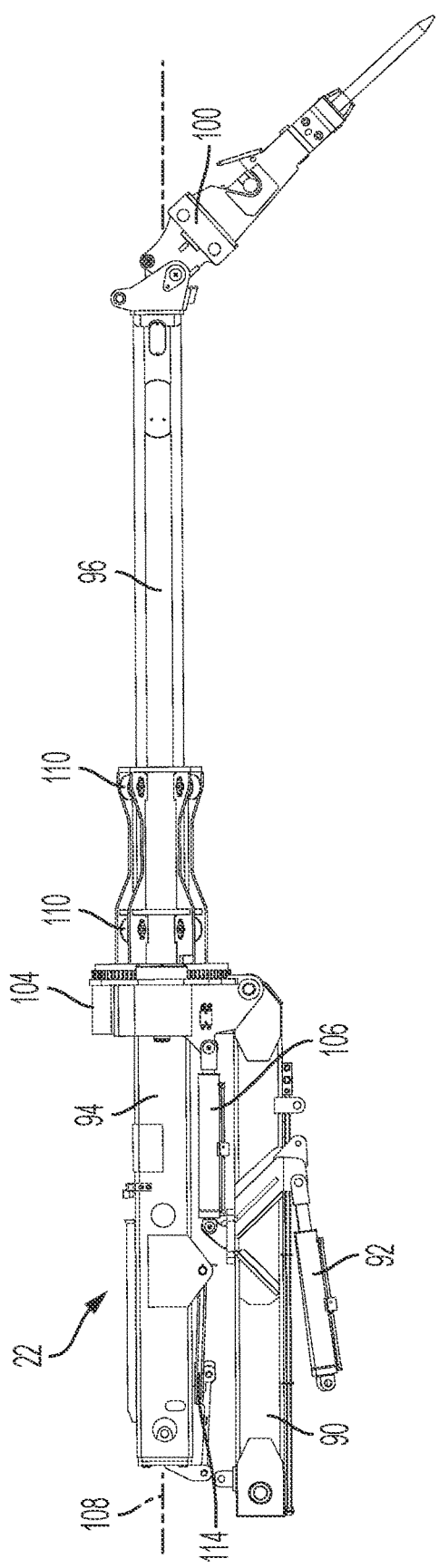
FIG. 7 is a right side view of the boom assembly of FIG. 6, showing an extended position of an inner boom arm.
Figure 8:
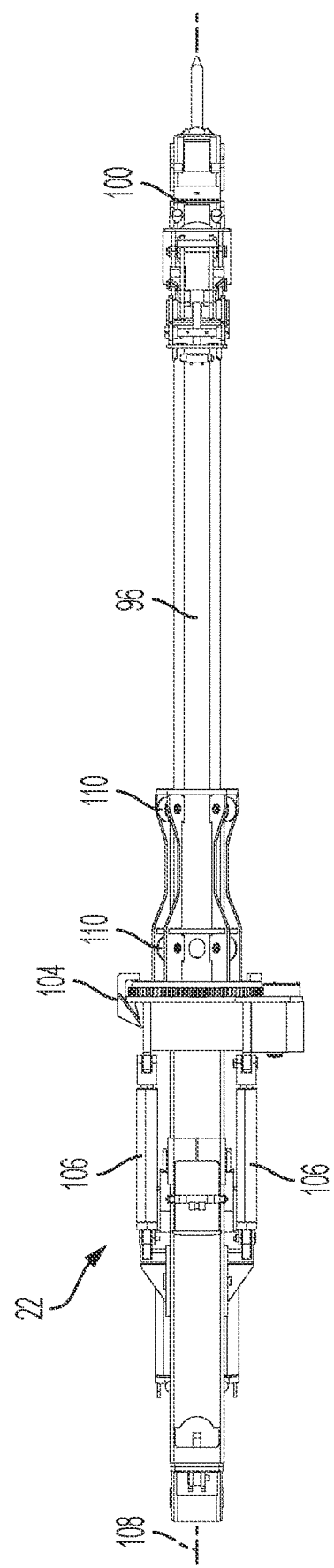
FIG. 8 is a top view of the boom assembly of FIG. 6, showing an extended position of an inner boom arm.
Figure 11:
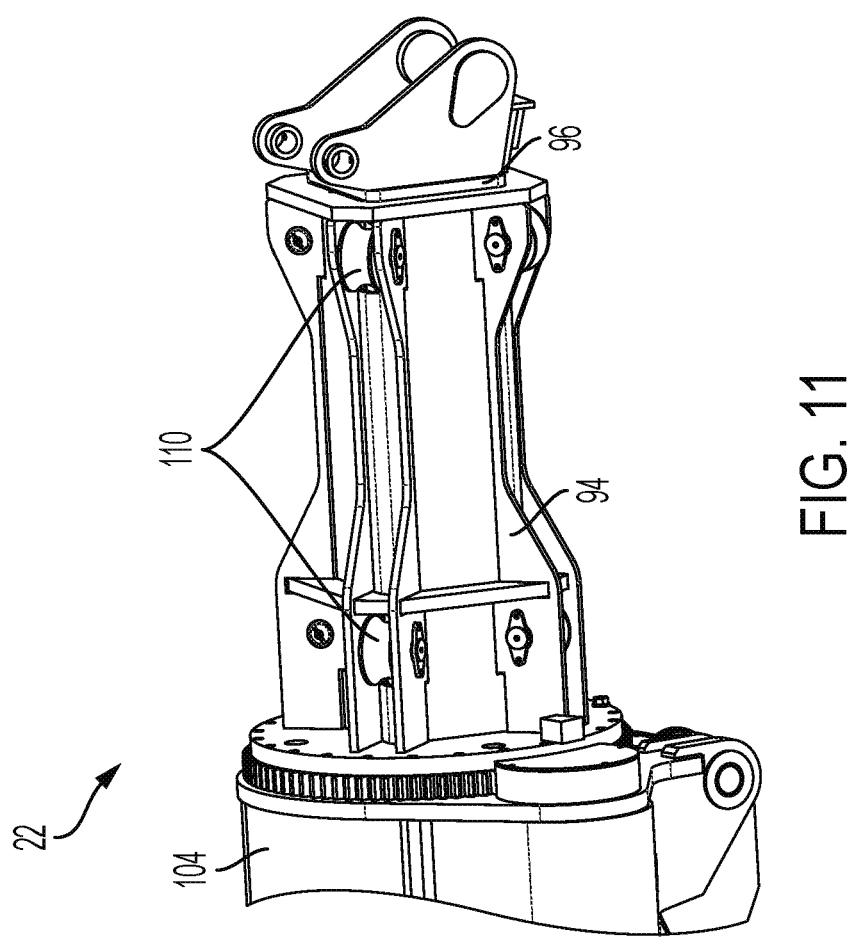
FIG. 11 is a partial perspective view of the boom assembly of FIG. 6, showing a retracted position of an inner boom arm.

The following description is provided to enable those skilled in the art to make and use the described embodiments contemplated for carrying out the invention. Various modifications, equivalents, variations, and alternatives, however, will remain readily apparent to those skilled in the art. Any and all such modifications, variations, equivalents, and alternatives are intended to fall within the spirit and scope of the present invention.

For purposes of the description hereinafter, the terms "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations, except where expressly specified to the contrary. It is also to be understood that the specific devices illustrated in the attached drawings, and described in the following specification, are simply exemplary embodiments of the invention. Hence, specific dimensions and other physical characteristics related to the embodiments disclosed herein are not to be considered as limiting.

Referring to FIGS. 1-21, a demolition machine 10, according to one aspect or embodiment of the present application, includes a deck 12, a drive assembly 14, an engine 16, an energy reservoir 18, a hydraulic reservoir 20, and a boom assembly 22. The demolition machine 10 is configured to remove refractory or other structure in and around furnaces for the various industries, including refractory linings used in the manufacture of metals. The demolition machine 10 is configured to be remotely-controlled and is configured to be lifted and placed into hard-to-access locations via a lift or crane, although other suitable arrangements may be utilized.

The deck 12 has a front edge 30, a rear edge 32, a left side 34, and a right side 36, with the deck 12 defining a central axis 38 along a direction extending from the rear edge 32 to the front edge 30 of the deck 12. The central axis 38 is equally spaced from the left side 34 and the right side 36 of the deck 12. The deck 12 may be manufactured from a steel plate, although other suitable arrangements may be utilized. The drive assembly 14 is secured to the deck 12, with the drive assembly 14 rotatable relative to the deck 12. As shown in FIGS. 1-4, the drive assembly 14 is a track undercarriage having first and second tracks 40, 42. In one aspect or embodiment, the tracks 40, 42 each have a track width 44 of 16 inches or less, which provides for improved maneuverability compared to tracks having a larger width. The first and second tracks 40, 42 each include a plurality of tie-down rings 54. The drive assembly 14 utilizes a high pressure/low flow motor 56 and a high torque hub to provide for increased ease of movement, although other suitable arrangements may be utilized.

Figure 18:
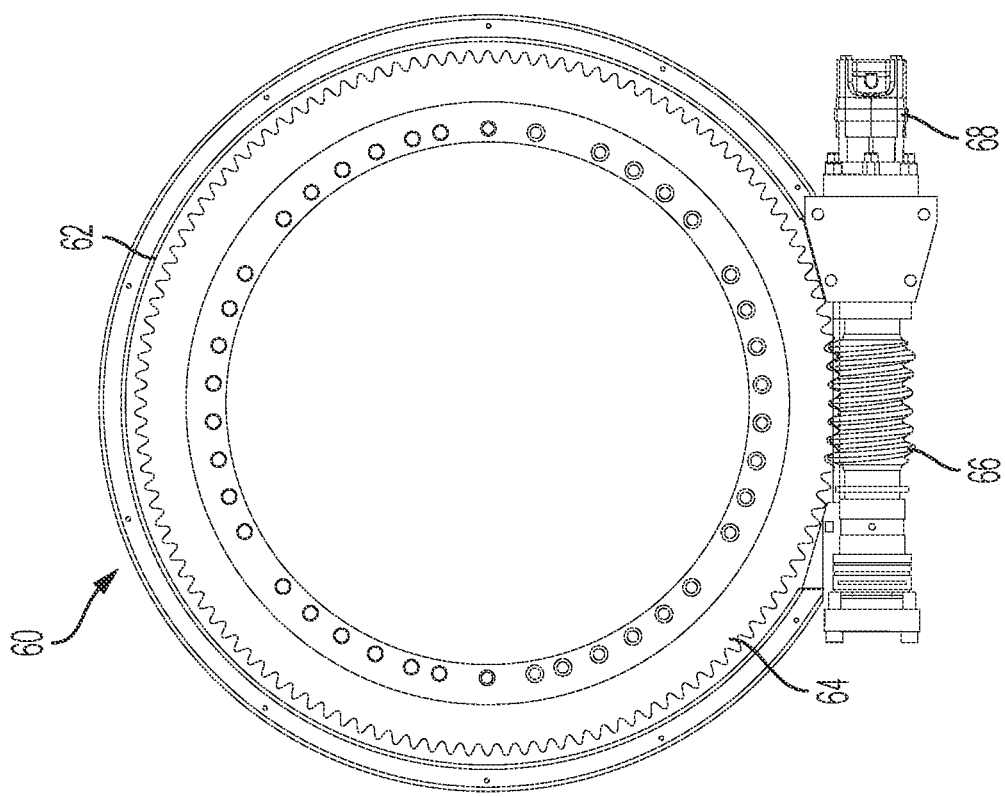
FIG. 18 is a top view of the bearing and pivot assembly of FIG. 17, showing engagement between gears of a bearing and worm gear.
Figure 17:
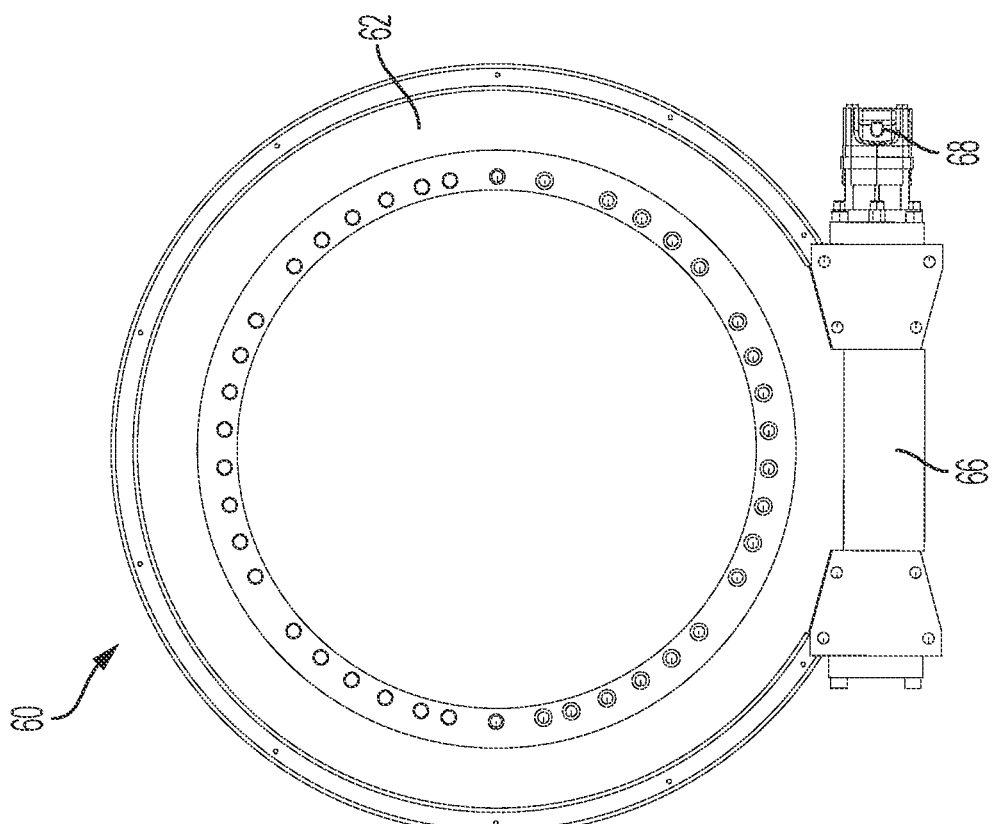
FIG. 17 is a top view of a bearing and pivot assembly of the demolition machine of FIG. 1.
Figure 19:
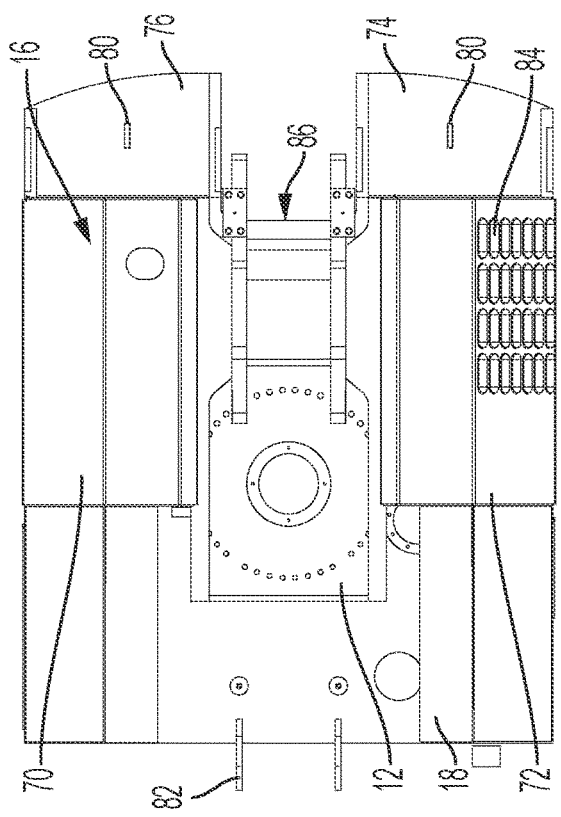
FIG. 19 is a top view of a deck and enclosure assembly of the demolition machine of FIG. 1.
Figure 21:
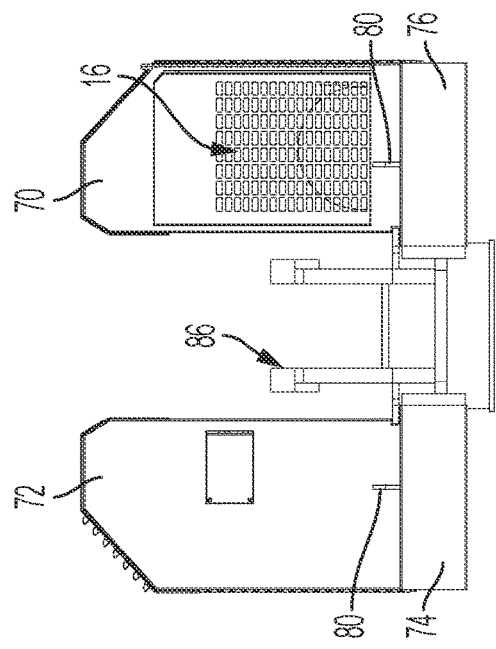
FIG. 21 is a rear view of the deck and enclosure assembly of FIG. 19.
Figure 20:
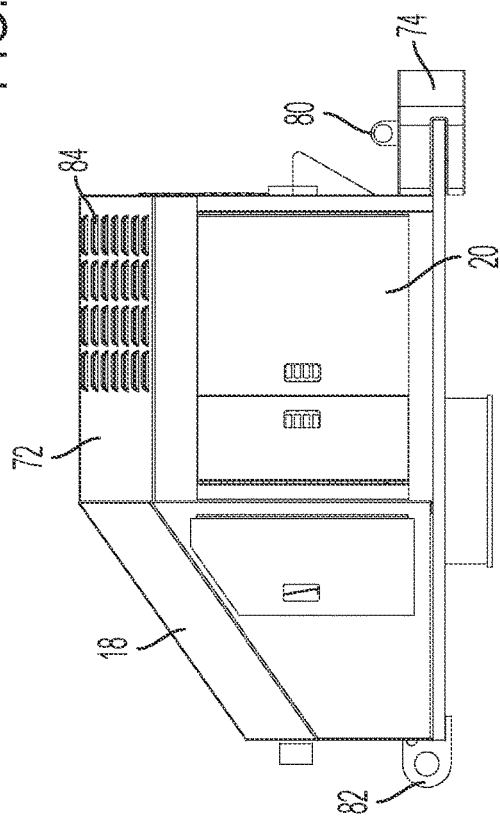
FIG. 20 is a left side view of the deck and enclosure assembly of FIG. 19.

Referring to FIGS. 17 and 18, the drive assembly 14 is rotatable relative to the deck 12 via a bearing and pivot assembly 60. The bearing and pivot assembly 60 includes a sealed bearing 62 having a bearing gear 64 and a worm gear 66 engaged with the bearing gear 64. In one aspect or embodiment, the engagement between the bearing gear 64 and the worm gear 66 includes at least six points of contact. The worm gear 66 is driven by a hydraulic motor 68.

Referring to FIGS. 1-4 and 19-21, the engine 16 is received by the deck 12 and positioned at one of the left side 34 and right side 36 of the deck 12, although the engine 16 is shown positioned at the right side 36 of the deck 12 in the figures. The energy reservoir 18 and hydraulic reservoir 20 are each received by the deck 12 and positioned on an opposite side of the deck 12 from the engine 16. The engine 16 is received within a first enclosure 70, and the energy reservoir 18 and hydraulic reservoir 20 are received within a second enclosure 72. The first enclosure 70 and the second enclosure 72 may each include one or more separate housings or structures to receive the components. In one aspect or embodiment, all components secured to the deck 12 are positioned within an enclosure to shield such components from damage, dust, debris, and potential contact with an operator. In one aspect or embodiment, the demolition machine 10 includes a lighting system including spot, flood, and warning indicators, which may be mounted to the first and second enclosures 70, 72 or other suitable component of the machine. In one aspect or embodiment, the energy reservoir 18 is a fuel tank, and the engine 16 is a diesel internal combustion engine. In another aspect or embodiment, the energy reservoir 18 is a battery and the engine 16 is an electric motor. The demolition machine 10 further includes first and second counterweights 74, 76 received by the deck 12 and positioned at the rear edge 32 of the deck 12. The first counterweight 74 is spaced from the second counterweight 76 to define a boom gap 78, with the boom gap 78 configured to receive a portion of the boom assembly 22 during use of the boom assembly 22. The first and second counterweights 74, 76 each include a lift point 80 to facilitate removal of the first and second counterweights 74, 76 from the deck 12. The deck 12 includes a pair of attachment rings 82 positioned at the front edge 30 of the deck 12.

The demolition machine 10 includes a hydraulic system in fluid communication with the hydraulic reservoir 20, with the hydraulic system including one or more of hydraulic lines, control valves, an electronic control system configured to permit remote control of the demolition machine 10, pumps, and motors. In one aspect or embodiment, the hydraulic system includes a kidney loop hydraulic cooling system 84 positioned adjacent to the hydraulic reservoir 20. The kidney loop hydraulic cooling system 84 may include a pump, fan, cooling fins, and/or filter. Some or all of the hydraulic lines may be hard lines configured to be resistant to damage when exposed to high temperatures. In one aspect or embodiment, some or all of the hydraulic lines are stainless steel hard lines.

Referring to FIGS. 1-13, the boom assembly 22 is secured to a boom support structure 86 of the deck 12. The boom support structure 86 includes a pair of spaced-apart brackets 88, although other suitable structures may be utilized. The boom assembly 22 is moveable relative to the deck 12. The boom support structure 86 is positioned on the central axis 38. Positioning the boom support structure 86 on the central axis 38, along with the position of the engine 16, the energy reservoir 18, the hydraulic reservoir 20, and the first and second counterweights 74, 76, ensures the demolition machine 10 is equally loaded and balanced. As discussed in more detail below, such positioning of the boom support structure 86 allows the lift or crane to lift the demolition machine 10 via the boom assembly 22 without tipping of the demolition machine 10, thereby providing safer and more controlled movement of the demolition machine 10 while transporting the demolition machine 10 via the lift or crane.

Figure 13:
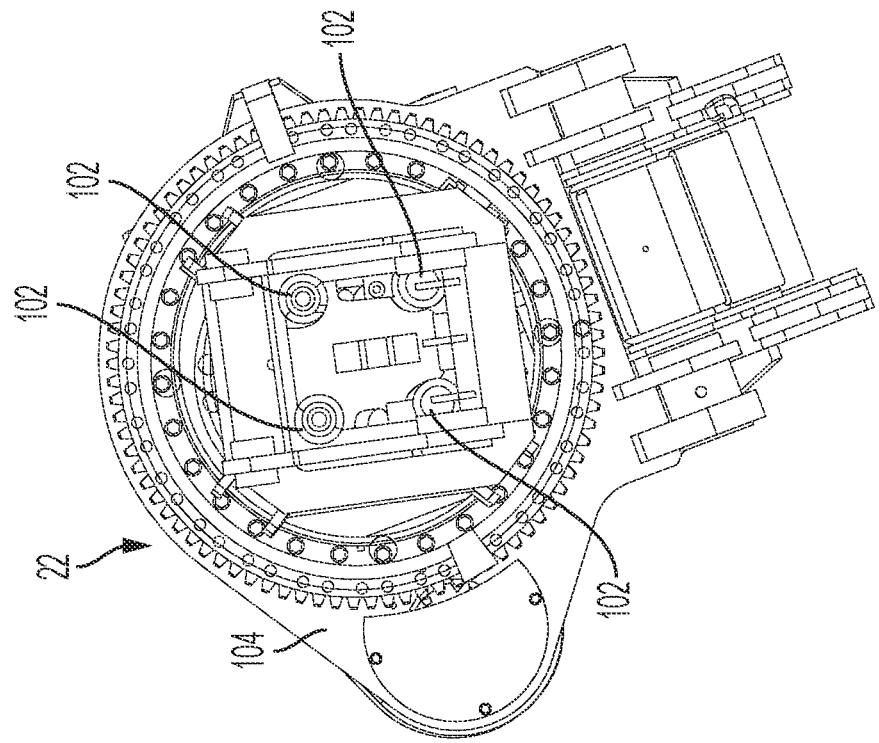
FIG. 13 is a rear perspective view of the boom assembly of FIG. 6, showing an internal passage of an inner boom arm.
Figure 12:
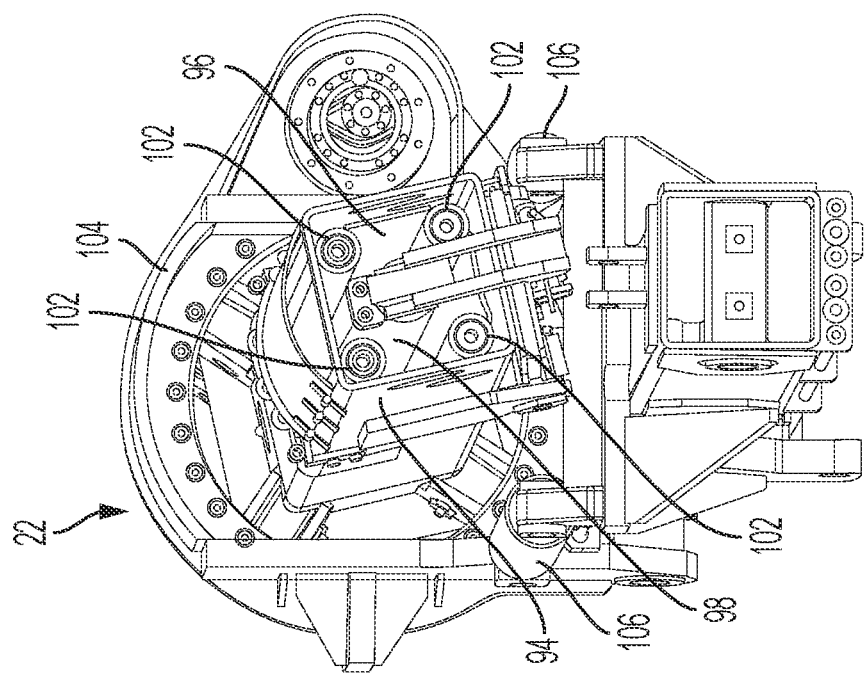
FIG. 12 is a front perspective view of the boom assembly of FIG. 6, showing an internal passage of an inner boom arm.
Figure 14:
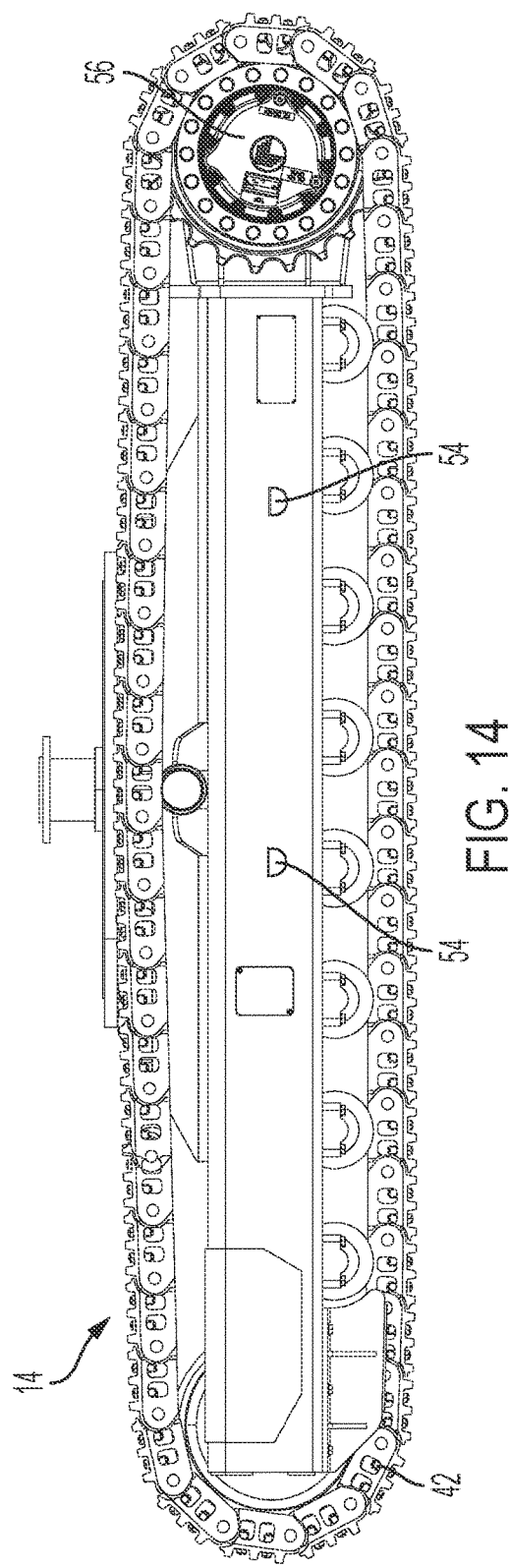
FIG. 14 is a side view of a track assembly of the demolition machine of FIG. 1.
Figure 15:
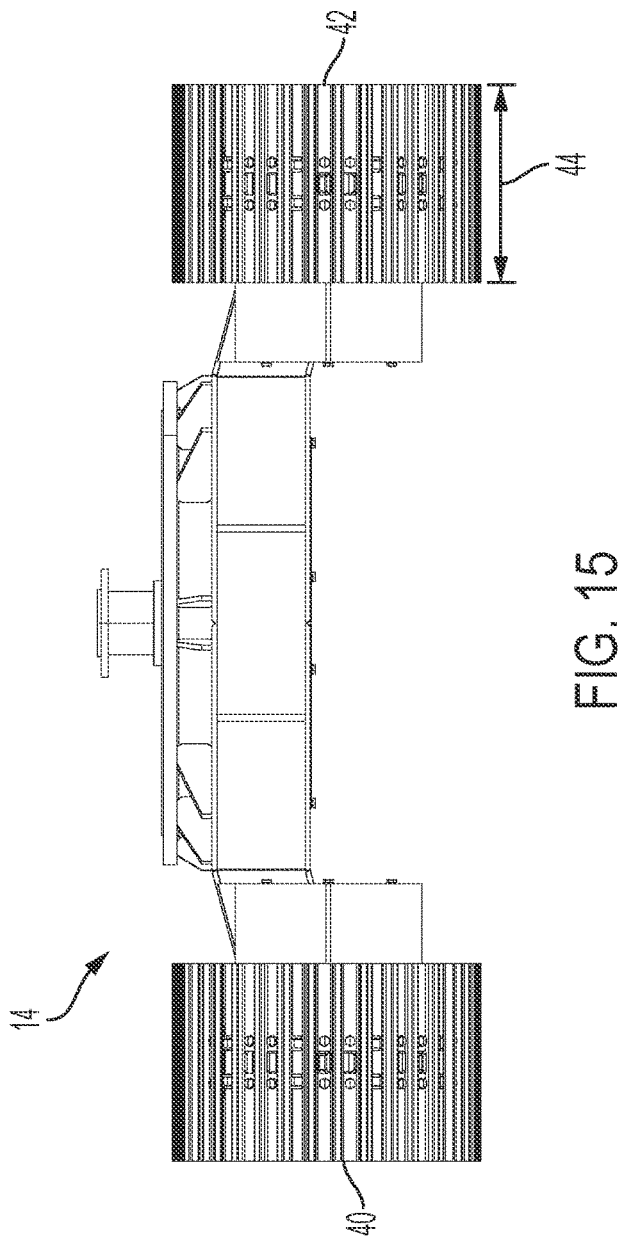
FIG. 15 is a front view of the track assembly of FIG. 14.
Figure 16:
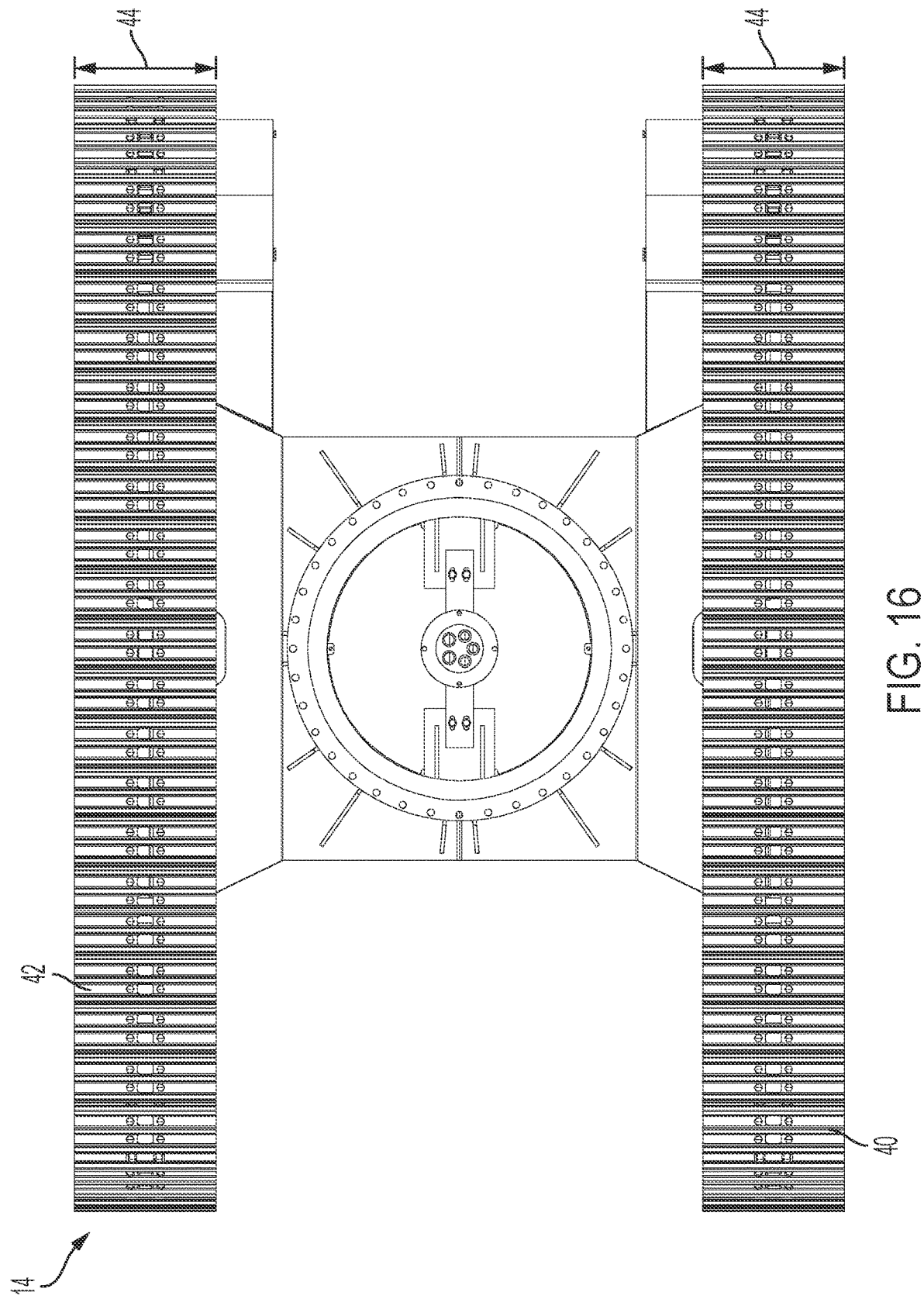
FIG. 16 is a top view of the track assembly of FIG. 14.

Referring again to FIGS. 1-13, the boom assembly 22 includes a main support 90 having a support cylinder 92 configured to raise and lower the main support 90, an outer boom arm 94 attached to the main support 90, an inner boom arm 96 received within the outer boom arm 94, with the inner boom arm 96 axially moveable relative to the outer boom arm 94 via an inner boom cylinder 98, and a hydraulically actuated tool implement 100. As shown in FIGS. 12 and 13, hydraulic lines 102, for the hydraulically actuated tool implement 100, are received within the inner boom arm 96. Positioning the hydraulic lines 102 for the tool implement 100 within the inner boom arm 96 protects the lines 102 from damage, heat, or other environmental conditions. The outer boom arm 94 is attached to the main support 90 via a cradle 104, and the cradle 104 is pivotable relative to the main support 90 via a cradle cylinder 106. The outer boom arm 94 is rotatable about a longitudinal axis 108 of the outer boom arm 94 and relative to the main support 90 via the cradle 104. The outer boom arm 94 includes a plurality of rollers 110 engaged with an outer surface of the inner boom arm 96. The rollers 110 are positioned within a plurality of openings defined by the outer boom arm 94 to allow engagement with the inner boom arm 96. The rollers 110 guide movement of the inner boom arm 96 relative to the outer boom arm 94. As shown in FIGS. 1-4, the hydraulically actuated tool implement 100 is a hydraulic hammer, although other tool implements, such as a bucket, may be utilized. In one aspect or embodiment, the support cylinder 92, the inner boom cylinder 98, and/or the cradle cylinder 106 are hydraulic cylinders having integrated counterbalance valves.

Referring to FIG. 10, hydraulic lines 112 for the support cylinder 92, the inner boom cylinder 98, and/or the cradle cylinder 106 are positioned on an underside of the main support 90, although other suitable positions may be utilized. Further, in one aspect or embodiment, a lift hoist bale 114 is attached to the outer boom arm 94. When the outer boom arm 94 is pivoted forward via the cradle cylinder 106, the lift hoist bale 114 can be accessed to lift the demolition machine 10 via the boom assembly 22. Due to the position of the boom support structure 86, along the central axis 38 and the balancing of the components on the deck 12, a center of gravity of the demolition machine 10 is positioned on or close to the central axis 38 such that lifting the demolition machine 10 via the lift hoist bale 114 will not cause tipping or listing of the demolition machine 10, which improves the safety and control of the demolition machine 10 while moving the demolition machine 10 via the lift or crane.

Elements of one disclosed aspect can be combined with elements of one or more other disclosed aspects to form different combinations, all of which are considered to be within the scope of the present invention.

While this disclosure has been described as having exemplary designs, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A demolition machine comprising:
a deck having a front edge, a rear edge, a left side, and a right side, the deck defining a central axis along a direction extending from the rear edge to the front edge, the central axis equally spaced from the left side and the right side of the deck;
a drive assembly secured to the deck, the drive assembly rotatable relative to the deck;
an engine received by the deck and positioned at one of the left side and right side of the deck;
an energy reservoir and hydraulic reservoir each received by the deck and positioned on an opposite side of the deck from the engine; and
a boom assembly secured to a boom support structure of the deck, the boom assembly moveable relative to the deck, wherein the boom support structure is positioned on the central axis.

2. The demolition machine of claim 1, wherein the engine is received within a first enclosure, and wherein the energy reservoir and hydraulic reservoir are received within a second enclosure.

3. The demolition machine of claim 1, wherein the energy reservoir comprises a fuel tank, and wherein the engine comprises a diesel internal combustion engine.

4. The demolition machine of claim 1, further comprising first and second counterweights received by the deck and positioned at the rear edge of the deck.

5. The demolition machine of claim 4, wherein the first counterweight is spaced from the second counterweight to define a boom gap, and wherein the boom gap is configured to receive a portion of the boom assembly during use of the boom assembly.

6. The demolition machine of claim 1, wherein the deck and/or the boom assembly comprises a hoist attachment, and wherein the hoist attachment is positioned along a center of gravity of the demolition machine such that the deck of the demolition machine remains balanced when lifting the demolition machine via the hoist attachment.

7. The demolition machine of claim 1, further comprising a hydraulic system in fluid communication with the hydraulic reservoir, the hydraulic system comprising a kidney loop hydraulic cooling system.

8. The demolition machine of claim 7, wherein the kidney loop hydraulic cooling system is positioned adjacent to the hydraulic reservoir.

9. The demolition machine of claim 1, wherein the drive assembly comprises a track undercarriage.

10. The demolition machine of claim 9, wherein the track undercarriage comprises a plurality of tie-down rings.

11. The demolition machine of claim 10, wherein the track undercarriage comprises first and second tracks having a track width, and wherein the track width is 16 inches or less.

12. The demolition machine of claim 1, wherein the drive assembly is rotatable relative to the deck via a bearing and pivot assembly, the bearing and pivot assembly comprising a sealed bearing having a bearing gear and a worm gear engaged with the bearing gear.

13. The demolition machine of claim 12, wherein the engagement between the bearing gear and the worm gear comprises at least six points of contact, and wherein the worm gear is driven by a hydraulic motor.

\* \* \* \* \*